United States Patent
Chennakeshu

[19]

[11] Patent Number: 5,835,480
[45] Date of Patent: Nov. 10, 1998

[54] CIRCUITRY AND METHOD FOR SIMULTANEOUSLY TRANSMITTING VOICE AND DATA INFORMATION

[76] Inventor: Sandeep Chennakeshu, 311 Glen Abbey Dr., Cary, N.C. 27513

[21] Appl. No.: 729,090

[22] Filed: Oct. 15, 1996

[51] Int. Cl.$^6$ .................................................. H04J 11/00
[52] U.S. Cl. ........................ 370/206; 370/342; 370/493
[58] Field of Search ................................. 370/206, 342, 370/441, 479, 493, 207, 320, 335; 379/206, 222

[56] References Cited

U.S. PATENT DOCUMENTS

| | | | |
|---|---|---|---|
| 5,537,436 | 7/1996 | Bottoms et al. | 375/222 |
| 5,559,791 | 9/1996 | Bremer et al. | 370/207 |

FOREIGN PATENT DOCUMENTS

| | | |
|---|---|---|
| 0 544 463 A2 | 2/1993 | European Pat. Off. . |
| 0 669 749 A1 | 8/1995 | European Pat. Off. . |
| 2 210 237 | 1/1989 | United Kingdom . |

*Primary Examiner*—Melvin Marcelo
*Attorney, Agent, or Firm*—Jenkens & Gilchrist, P.C.

[57] ABSTRACT

Circuitry, and an associated method, for permitting simultaneous transmission of multiple forms of information, such as that generated during operation of a multi-media communication device. Signal bits of the different forms of information are together mapped onto symbols of a multi-level, multi-phase modulation symbol set. Transmission of signals representative of the symbols are transmitted, thereby to effectuate the simultaneous transmission of the multiple forms of information.

21 Claims, 3 Drawing Sheets

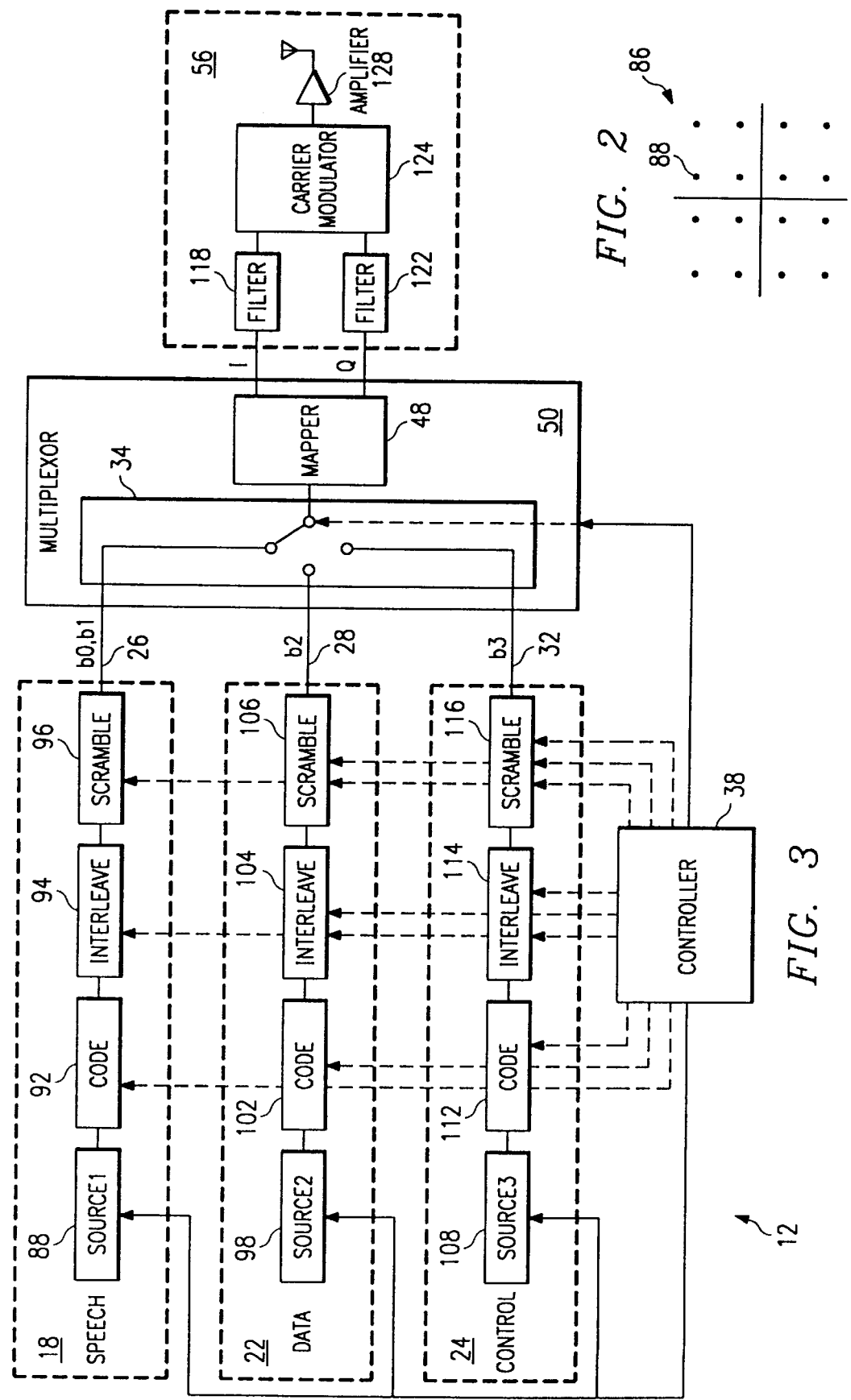

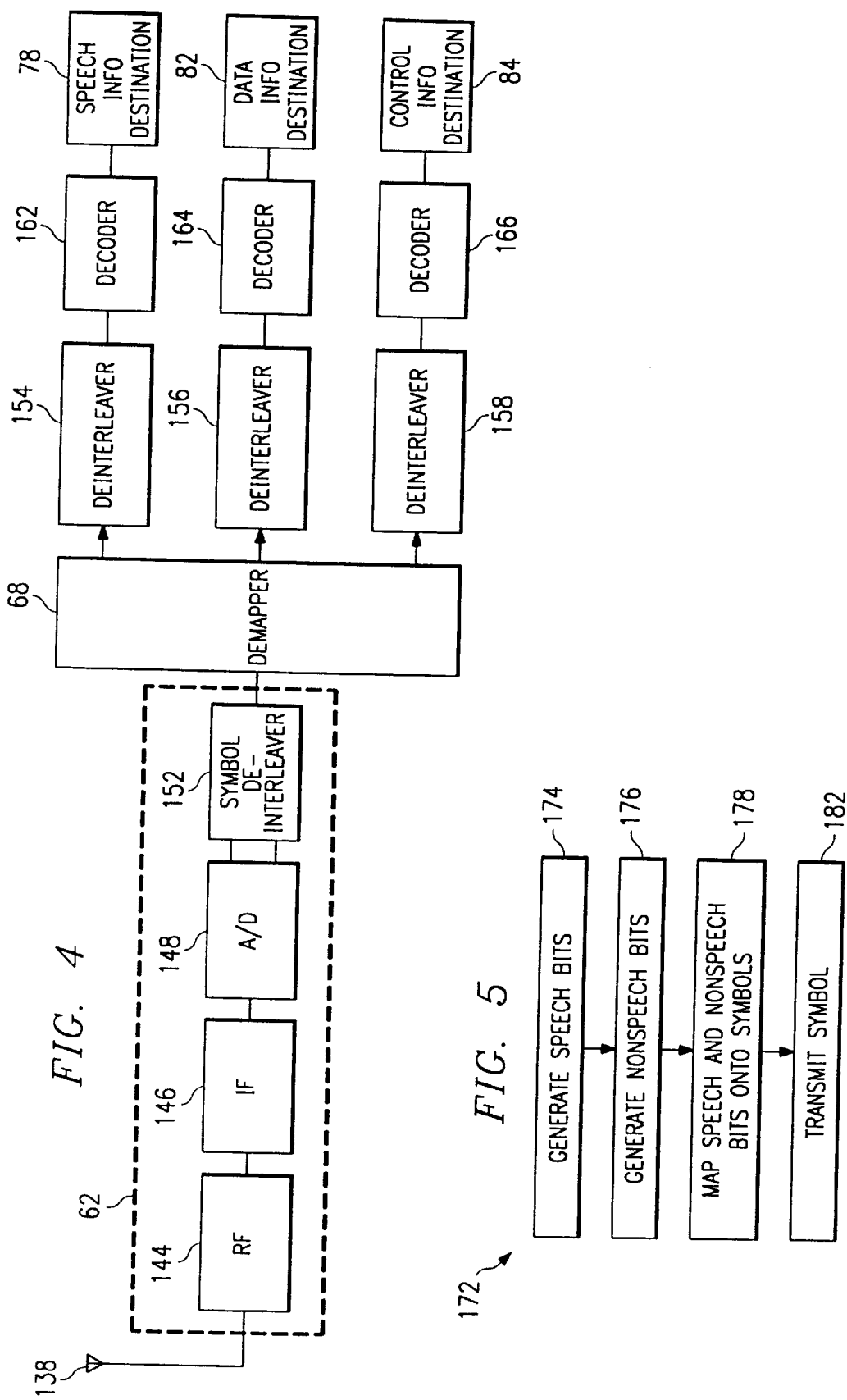

CIRCUITRY AND METHOD FOR SIMULTANEOUSLY TRANSMITTING VOICE AND DATA INFORMATION

The present invention relates generally to the transmission of voice and data information, such as that transmitted during operation of a multi-media communication device. More particularly, the present invention relates to circuitry, and an associated method, which selectively combines the voice and data information to permit the voice and data information to be transmitted simultaneously.

Operation of the present invention facilitates quick communication of the voice and data information as both the voice and data information are simultaneously transmitted but does not require the bandwidth of the communication channel upon which a signal containing the voice and data information to be of an increased bandwidth. The circuitry and method of the present invention is advantageously utilized in a wireless, e.g., a cellular or other radiotelephonic, communication system in which the channels defined therein are of set bandwidths.

BACKGROUND OF THE INVENTION

A communication system is comprised, at a minimum, of a transmitter and a receiver interconnected by a communication channel. Communication signals transmitted by the transmitter are transmitted upon the communication channel to be received by the receiver. A radio communication system is a communication system in which the communication channel is formed of one or more frequency bands of the electromagnetic frequency spectrum. Because a fixed or hard-wired connection is not required to be formed between the transmitter and the receiver, a radio communication system is advantageously utilized when the use of such fixed or hard-wired connections would be inconvenient or impractical.

A cellular communication system is a type of radio communication system. When the infrastructure, hereinafter referred to as the network, of the cellular communication system is installed throughout a geographical area, a subscriber to the cellular system is generally able to communicate telephonically when positioned at any location in the geographical area encompassed by the network.

Technological advancements have permitted the introduction of new types and combinations of communication devices which permit the communication of information in new forms. Some of such communication devices permit the communication of both isochronous data, i.e., time-bounded data, and asynchronous data, i.e., not time-bounded data. Speech and video data are exemplary of isochronous data.

For instance, multi-media, or other multi-mode communication devices permit the communication of two or more types of data. Both voice and textual, or diagrammatic, data is transmitted. Use of a multi-media device permits, e.g., textual or diagrammatic information to be sent from the device together with voice information. Such information is received at another multi-media device. Some of such multi-mode communication devices also permit the communication of video data. Communication of information between a transmitting station and a receiving station are more effectively effectuated as two different types of information are together transmitted.

Many of the multi-mode communication devices are constructed to be operable to communicate the two or more forms of information pursuant to the telephonic lines of a telephonic system. Some of such multi-mode communication devices are further operable to communicate the information pursuant to a wireless, e.g., a cellular or other radiotelephonic communication system.

To most effectively effectuate communication of the information generated at the multi-mode device positioned at the transmitting station to the receiving station, the two forms of communication must be timely transmitted, vis-a-vis one another, to the receiving station. If the different forms of information are transmitted separately, such separate transmission would entail delays. Such delays would reduce the efficacy of the communication of the two forms of information to the receiving station.

Several methodologies, and associated circuitry for implementing such methodologies, have been developed to facilitate the timely communication of the two or more forms of information from a transmitting station to a receiving station. Most simply, the different forms of information can be concurrently transmitted on separate channels, utilizing separate circuitry for the respective transmission and reception of the different forms of information. However, this manner of communicating the information is bandwidth-consumptive and is not desirable in communication systems, such as a cellular communication system, having limited bandwidth capacities.

When the forms of information include a voice, i.e., speech, information and "data", i.e., non-speech information, such as that typically generated by a multi-mode communication device, signals representative of the non-speech information and signals representative of analog speech information can be added together, with appropriate gains, and transmitted together. The signals representative of the non-speech information can further include conventional, error correction codes to protect the data integrity of the non-speech information. When such a summed signal is received at a receiving station, the separate signals are recovered by circuitry of the receiving station. The non-speech information is recovered by a multi-step process. First, a decoding process is performed to form a decoded signal. Then, the decoded signal is subtracted from a receive signal. The remaining portion of the signal is applied to an analog speech decoder. Such a scheme is used, for example, in certain constructions of voice-band modems.

In a time division multiple access (TDMA) system, bursts of portions of a signal representative of the non-speech i.e., asynchronous, information and bursts of portions of a signal representative of speech, i.e., isochronous, information are sometimes multiplexed together and transmitted during different time slots defined in the TDMA system. Bursts of the different signals can also be transmitted together during a single time slot by defining and reserving fields of information transmitted during a single time slot. Such schemes, however, still require that the different forms of information be transmitted separately and, in any event, necessarily is limited to usage in a TDMA communication system.

In a direct sequence code division multiple access (DS-CDMA) communication system, signals representative of the speech and non-speech information can be coded with different sequences, in conventional fashion, and then added and sent simultaneously. Circuitry of a receiving station which receives the concurrently-transmitted signals decodes the sequences with their appropriate decoding keys. Such a scheme is typically limited to use in a CDMA communication system and can not be conveniently implemented in other types of communication systems.

As existing manners by which to concurrently transmit the different forms of information required to be communicated to effectuate multi-mode communications are limited to usage in particular types of communication systems or suffer other limitations, improved manners by which to concurrently transmit different forms of information would be advantageous.

It is in light of this background information related to the communication of information generated by a multi-mode communication device that the significant improvements of the present invention have evolved.

SUMMARY OF THE INVENTION

The present invention advantageously facilitates quick communication of two or more forms of information, such as that formed during operation of a multi-mode communication device. The two or more forms of information are combined together and simultaneously transmitted upon a communication channel. The bandwidth of the communication channel does not need to be increased or otherwise redefined to permit the transmission of the two forms of information simultaneously.

Operation of the present invention is particularly advantageously utilized when the multi-mode communication device is to be operable in a wireless communication system, such as a cellular communication system, in which the communication channels are bandwidth-limited. Signal bits forming portions of the two or more different forms of information are mapped together upon a single modulation symbol, and modulation symbols so-formed are transmitted pursuant to any of many selected communication schemes. Operation of the present invention is therefore not limited for utilization in a single, particular communication scheme.

In one aspect of the present invention, speech and non-speech information are both generated during operation of a multi-mode communication device. Signals indicative of the speech information and signals indicative of the non-speech information are digitized to form speech bits and non-speech bits. Selected combinations of the speech bits and non-speech bits are mapped onto modulation symbols, and the modulation symbols are modulated upon a carrier signal, thereafter to be transmitted upon a communication channel to a receiving station. Once received, the modulation symbols are extracted from the carrier signal, a reverse-mapping process is performed, and the speech and the non-speech information is recovered.

In another aspect of the present invention, the selected mapping scheme is variable, dependent upon the rate at which the speech information and the non-speech information is generated. During times in which lessened amounts of speech information are generated, such as during pauses by a speaker generating the speech signals, the ratio of the mapping of the speech bits and the non-speech bits onto the modulation symbols are altered, thereby to maximize the transmission rate of the non-speech data.

In these and other aspects, therefore, information-combining circuitry, and an associated method, for a transmitter is disclosed. The transmitter is operable to transmit isochronous data representative of isochronous information and non-speech data representative of asynchronous information upon a communication channel. A combined signal is formed which, when transmitted, is permits simultaneous transmission of the isochronous data and the asynchronous data upon the communication channel. A signal allocator has at least one input port selectively coupled to receive signals representative of the isochronous data and signals representative of the asynchronous data. A signal allocator forms an allocated signal of values responsive to values of the signals representative of the isochronous data and the signals representative of the asynchronous data selectively coupled to be received thereat. A mapper is coupled to receive the allocated signal. The mapper maps selected portions of the allocated signal onto symbols of a multi-symbol modulation symbol set. The symbols of the multi-symbol set onto which the selected portions of the allocated signal are mapped are dependent upon values of the allocated signal. The symbols onto which the portions of the allocated isochronous data and the asynchronous data signal are mapped forming the combined signal.

A more complete appreciation of the present invention and the scope thereof can be obtained from the accompanying drawings which are briefly summarized below, the following detailed description of the presently-preferred embodiments of the invention, and the appended claims.

BRIEF DESCRIPTION OF THE DRAWINGS

FIG. 2 illustrates a graphical representation of demodulation symbols of a modulation symbol set onto which signal bits to be transmitted by a transmitting station forming a portion of the communication system shown in FIG. 1 are mapped during operation of an embodiment of the present invention.

FIG. 3 illustrates a functional block diagram showing in greater detail the transmitting station forming a portion of the communication system shown in FIG. 1.

FIG. 4 illustrates a functional block diagram of the receiving station forming a portion of the communication system shown in FIG. 1.

FIG. 5 illustrates a method flow diagram listing the method steps of the method of an embodiment of the present invention.

DETAILED DESCRIPTION

Figure 1:
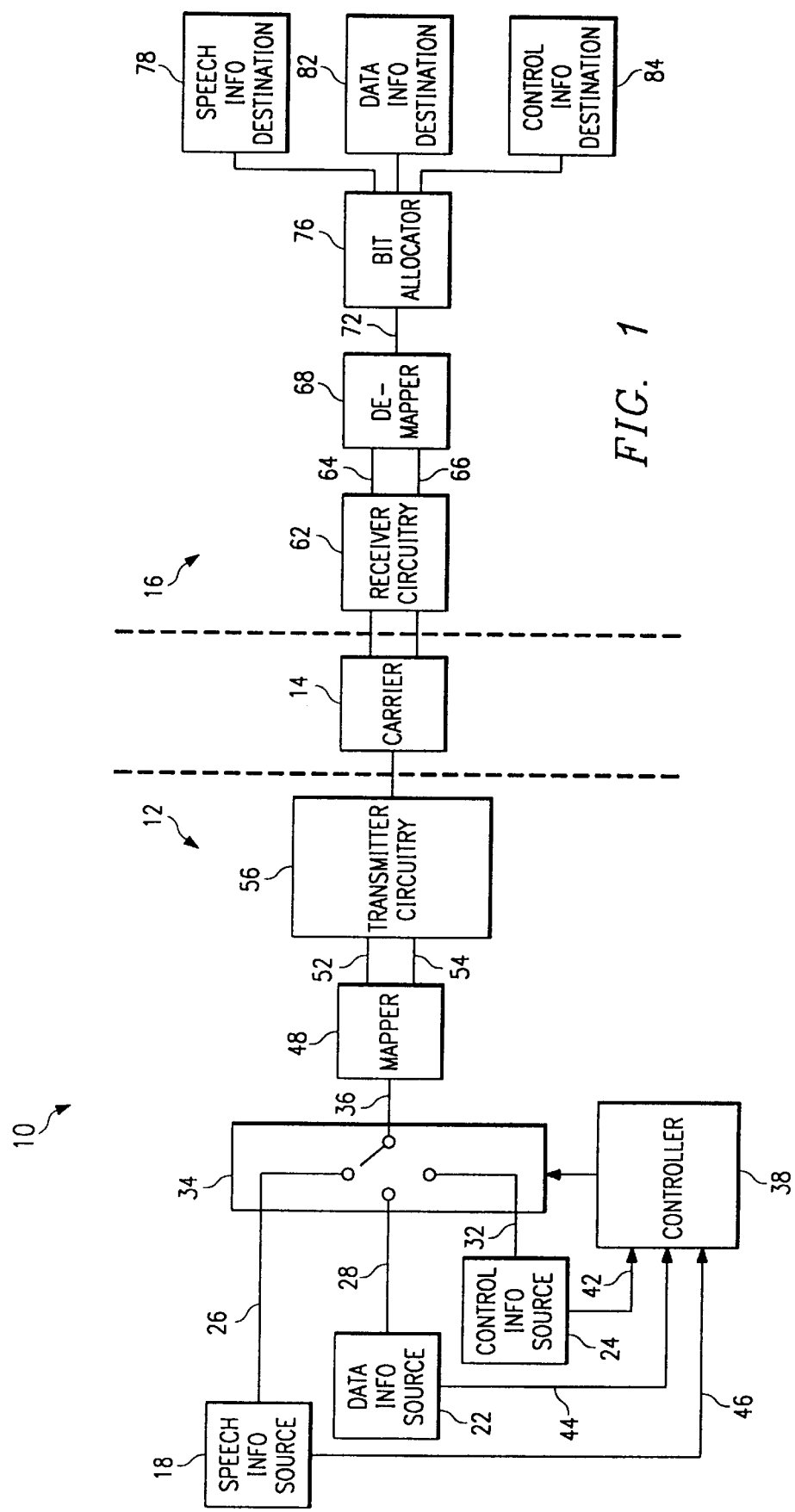
FIG. 1 illustrates a functional block diagram of a communication system in which an embodiment of the present invention is operable.

Referring first to FIG. 1, a communication system, shown generally at 10, is operable to communicate information formed at a transmitting station to a remotely-positioned receiving station. In the embodiment illustrated in the figure, the communication system 10 forms a radio communication system. It should be understood, of course, that the teachings of the present invention can be similarly embodied in other types of communication systems.

The communication system 10 includes a transmitting station 12 which generates a radio frequency signal which is transmitted upon a carrier 14. Depending upon the type of communication scheme utilized by the communication system 10, the carrier 14 is comprised, in conventional fashion, of a selected frequency channel, a selected time slot on a carrier, or a selected time slot on various carriers if the signals transmitted by the transmitting station are transmitted pursuant to a frequency hopping scheme, etc. A receiving station 16 receives the signal transmitted by the transmitting station 12 upon the carrier 14. The informational content of the signal transmitted by the transmitting station 12 is thereafter recovered by the receiving station 16.

The transmitting station is selectively operable to transmit more than one form of information concurrently upon the carrier 14. In the illustrated embodiment, three types of information are generated at the transmitting station 12, here indicated to be formed by a speech (or other isochronous, such as Video) information source 18, a "data" source 22 formed of textual or diagrammatic information and a control information source 24 (or other asynchronous information source). In one embodiment, bits $b_0$ and $b_1$ are generated by the source 18, bit $b_2$ is generated by the source 22, and $b_3$ is generated by the source 24.

The sources 18, 22, and 24 are exemplary of the information sources of information generated during operation of a multi-media communication device, such as a personal computer-telephone combination. Other types of multi-mode communication devices can analogously be represented.

The speech information source 18 generates speech bits which together form a signal representative of the speech information generated at the speech information source. The speech information source 18 is representative, for example, of voice signals generated by a speaker when speaking into a telephonic device. The speech information may be compressed by a speed encoding device. Similarly, data information bits are generated by the data information source 22 on line 28. The data information bits together form a signal representative of the data information generated at the data information source. And, the control information source 24 generates control information bits on line 32. The control information bits together form a signal representative of the control information generated at the control information source.

The lines 26, 28, and 32 are coupled to input terminals of a signal allocator 34, here formed of a multiplexer device. The speech allocator forms an allocated signal on line 36 by selectively passing signal bits generated on the lines 26, 28, and 32. The signal allocator 34 is shown functionally as a switching device for selectively coupling the lines 26, 28, and 32 to the line 36, thereby forming the allocated signal of selected combinations of the signal bits generated on the lines 26, 28, and 32.

Operation of the signal allocator 34 to selectively pass signal bits generated on the lines 26, 28, and 32 is controlled by a controller 38 which, in the embodiment illustrated in the figure, is coupled, by way of lines 42, 44, and 46 to the sources 18, 22, and 24, respectively, to receive indications of the rates at which the various forms of information formed at the various ones of the information sources are generated.

The manner by which the allocated signal generated on the line 36 is formed, in another embodiment, is responsive to a set pattern, i.e., a selected number of bits taken from the line 26, a selected number of bits taken from the line 28, and a selected number of bits taken from the line 32. Utilization of the indications of the rates at which the information sources 18-24 generate their respective signal bits permits improved efficiencies of information transmission. If, for example, the speech information source 18 is temporarily not generating signal bits on the line 26, the signal allocator 34 can be caused to generate an allocated signal formed of signal bits generated only by the data information source 22 and the control information source 24.

The allocated signal generated on the line 36 is applied to a signal mapper 48. The signal mapper maps bits of the allocated signal generated on the line 36 onto symbols of a modulation symbol set. An exemplary modulation symbol set onto which the mapper 48 maps bits of the allocated signal shall be described below with respect to FIG. 2.

The mapper 48 generates signals on lines 52 and 54 which are coupled to transmitter circuitry 56. In the illustrated embodiment, the signals representative of the symbols onto which the mapper 48 maps the signal bits of the allocated signal are referenced in terms of I- and Q-values. In other embodiments, mappers operative in other manners can, of course, map the signal bits onto symbols defined in other manners. The transmitter circuitry 56 is operable to convert the signals applied thereto on lines 52 and 54 into a form to permit their transmission upon the carrier 14 according to a selected communication scheme, such as a TDMA or CDMA communication scheme.

The receiving station 16 includes receiver circuitry 62 for receiving the signal transmitted to the receiving station by the transmitting station. The receiver circuitry 62 is operable in conventional manner to extract the informational components of the signal received thereat and to generate signals representative thereof on lines 64 and 66 which are coupled to a demapper 68.

The demapper 68 is operable in a process generally reverse to that of the mapper 48 to convert the symbols upon which the different information sources of the transmitting station 12 are mapped. Signals generated on line 72 are applied to a bit allocator 76 which allocates the signal bits to a speech information destination 78, a data information destination 82, and a control information destination 84, as appropriate. Thereby, the multiple forms of information generated at the information sources 18, 22, and 24 reach their respective destinations 78, 82, and 84.

FIG. 2 illustrates an exemplary modulation symbol set, shown generally at 86, onto which the mapper 48 (shown in FIG. 1) maps the bits of a signal applied thereto. The symbols of the modulation symbol set are defined in terms of an I-component portion and a Q-component portion, upon which the abscissa and ordinate axes are scaled in FIG. 2. Each symbol 88 of the symbol set 86 is represented by a point in the figure, and each symbol 88 is defined by a particular I-component value and Q-component value. The modulation symbol set 86 forms a multi-level, multi-phase symbol set, here formed of sixteen symbols.

In one mapping scheme, when each of the information sources 18, 22, and 24 is generating signal bits on a respective one of the lines 26, 28, and 32, the signal allocator 34 is operable to pass signal bits in a manner such that the value of the I-component portion is determined by the equation: $I=2b_1+b_0$ and the Q-component value is determined by the equation: $Q=2b_3+b_2$. As described previously with respect to FIG. 1, the bits $b_o$ and $b_1$ correspond to bits of the signal representative of the speech information, bit $b_2$ corresponds to a bit of the data information, and bit $b_3$ corresponds to a bit of the control information. When mapped in this manner, the speech information source 18 has twice as many bits allocated for transmission as that of the data information source 22 and the control information source 24.

Indications of the partitions of bits, such as the just-described partition of bits, is part of the informational content of the control information generated by the control information source 24. Thereby, the partition of bits is communicated to the receiving station 12 during transmission of the signal generated at the transmitting station. Reception of such indications permit the receiving station to properly recover the informational content of the transmitted signal.

As noted briefly above, when the controller 38 is operable to control the signal allocator 34 responsive to the indications of the information-generation rates applied to the controller by way of lines 42, 44, and 46, reallocation of the signal bits applied to the mapper 48 to be mapped onto selected ones of the symbols 88 can be made, such as, for example, when then rate of speech information generation drops. Reallocation can also be effectuated responsive to changes in channel, i.e., carrier 14, characteristics. Increased levels of error correction coding or increased redundancy of the speech bits forming the signal representative of the speech information can be effectuated to facilitate the transmission of the informational content of the speech information. Reallocation of signal bits can also be made to effectuate communication of only control information which, for instance, facilitates reconfiguration of the allocation of the signal bits and the modulation symbols 88 onto which the signal bits are mapped.

FIG. 3 illustrates the transmitting station 12 in greater detail. The speech information source 18 is here shown to include a speech signal generator 88, which generates a speech signal which is applied to a coder 92. The coder generates a coded signal which is applied to an interleaver 94. The interleaver 94 generates an interleaved signal which is applied to a scrambler 96. The scrambler 96 scrambles the interleaved signal and generates a scrambled signal forming signal bits on the line 26. Similarly, the data information source 22 is shown to be formed of a data information signal generator 98 for generating a data information signal which is applied to a coder 102.

The coder 102 generates a coded signal which is applied to a interleaver 104 which generates an interleaved signal responsive thereto. The interleaved signal is applied to a scrambler 106, and the scrambler generates a scrambled signal formed of signal bits on the line 28. And, the control information source 24 is shown to be formed of a control information generator 108 which generates a signal which is applied to a coder 112. The coder 112 generates a coded signal which is applied to an interleaver 114. The interleaver 114 generates an interleaved signal which is applied to a scrambler 116. The scrambler generates a scrambled signal formed of signal bits on the line 32. The controller 38 is coupled by way of lines 42*a*, 42*b*, 42*c*, and 42*d* to the speech signal generator 88, coder 92, interleaver 94, and scrambler 96. Similarly, the controller 38 is coupled by way of lines 44*a–d* and by way of lines 46*a–d* to the corresponding elements of the data signal generator and control signal generator 22 and 24, respectively.

The lines 26, 28, and 32 are again shown to be coupled to the signal allocator 34 of the information combiner 50. The mapper, coupled to receive the allocated signal generated by the signal allocator is also again illustrated. The mapper 48 generates I- and Q-component signals which are applied to the transmitting circuitry 56.

Transmitting circuitry 56 includes filters 118 and 122 for receiving the I- and Q-component signals, respectively, for filtering the component portions applied thereto. Filtered signals formed by the respective filters 118 and 122 are applied to a carrier modulator 124 which modulates the signal component portions which, once modulated, are applied to an amplifier 128 which amplifies the modulated signal for transmission by an antenna 132.

FIG. 4 illustrates the receiving station 16 in greater detail. Signals transmitted by the transmitting station 12 (shown in FIGS. 1 and 3) to the receiving station 16 are detected by an antenna 138 which transduces the receive signals and generates signals on line 142 which is coupled to a radio frequency component portion 144 of the receiver circuitry 62.

The radio frequency component portion 144 is operable in conventional manner to down-convert the radio frequency, electrical signal applied thereto and to generate an intermediate frequency signal for application to an intermediate frequency component portion 146 of the receiver circuitry 62. The intermediate frequency component portion 146 is operable in conventional manner to down-convert the intermediate frequency signals and to generate a down-converted signal which is applied to an analog-to-digital converter 148 which digitizes the signal applied thereto.

I- and Q-component portions of the digitized signal are applied to a symbol deinterleaver 152. The symbol deinterleaver 152 forms a deinterleaved signal which is applied to the demapper 68, shown previously in FIG. 1. Signal bits from which the demapper converts the symbols applied thereto. The signal bits are routed by way of the bit allocator 76 to an appropriate one of the deinterleavers 154, 156, and 158. The deinterleavers deinterleave the signal bits applied thereto and generate deinterleave signals which are applied to decoders 162, 164, and 166, respectively. The decoders generate decoded signals which are applied to a speech information destination 78, a data information destination 82 and the control information destination 84.

For purposes of explanation, only a single transmitting station 12 and a single receiving station 16 has been thus far described. It should be understood, of course that a multi-mode communication system typically permits two-way communication and that a multi-mode communication device typically includes circuitry of both the transmitting station 12 and receiving station 16 shown in the preceding figures. Two-way communication of two or more forms of information simultaneously is effectuated through operation of the present invention thereby.

A multi-mode communication device operable pursuant to an embodiment of the present invention is particularly well suited to communicate simultaneously the two or more forms of information pursuant to a cellular, or other radiotelephonic, communication system. Once the signal bits are mapped onto selected symbols of a modulation symbol set, in manners as above-described, the signal formed of such symbols can be modulated according to the modulation scheme of a cellular communication system, as desired. The signal is transmitted to a base station of the cellular communication system and, thereafter applied, in conventional fashion, to a desired receiving location whereat the information is recovered and appropriately utilized. Because the information is transmitted simultaneously and without expansion of bandwidth requirements, the transfer of the appropriate information is advantageously effectuated.

FIG. 5 illustrates a method, shown generally at 172 of an embodiment of the present invention. The method 172 simultaneously transmits speech data representative of speech information and non-speech data representative of non-speech information upon a communication channel.

First and indicated by the block 174, speech bits indicative of the speech information is generated. And, as indicated by the block 176, non-speech bits indicative of the non-speech information is also generated. Then, and as indicated by the block 178, the speech and non-speech bits are selectively mapped onto symbols of a multi-level modulation level symbol set. The symbols of the multi-level symbol set onto which the bits are selectively mapped are dependent upon values of the speech and non-speech bits. Thereafter, and as indicated by the block 182, the symbol forming the speech and non-speech data is transmitted upon the communication channel.

The previous descriptions are of preferred examples for implementing the invention, and the scope of the invention should not necessarily be limited by this description. The scope of the present invention is defined by the following claims.

What is claimed is:

1. A communication device for simultaneously transmitting isochronous data representative of isochronous information and asynchronous data representative of asynchronous information upon a communication channel, said communication device comprising:

an isochronous information bit generator coupled to receive the isochronous information, said isochronous information bit generator for generating isochronous bits indicative of the isochronous information;

an asynchronous information bit generator coupled to receive the asynchronous information, said asynchronous information bit generator for generating asynchronous bits indicative of the asynchronous information;

a mapper coupled to receive the isochronous bits and the asynchronous bits, said mapper for selectively mapping the isochronous and asynchronous bits, respectively, together onto symbols of a multi-level modulation symbol set, the symbols of the multilevel symbol set onto which the isochronous and asynchronous bits are mapped dependent upon values of the isochronous and asynchronous bits received by said mapper and forming the isochronous and asynchronous data; and a transmitter coupled to receive the symbols onto which the isochronous and asynchronous bits are mapped by said mapper, said transmitter for transmitting the symbols, thereby to simultaneously transmit the isochronous and asynchronous data upon the communication channel.

2. In a communication system having a transmitting station and a receiving station, a combination with the transmitting station of transmit circuitry for simultaneously transmitting isochronous and asynchronous data upon a communication channel to the receiving station, said circuitry comprising:

an isochronous information bit generator coupled to receive the isochronous information, said isochronous information bit generator for generating speech bits indicative of the isochronous information;

an asynchronous information bit generator coupled to receive the asynchronous information, said asynchronous information bit generator for generating asynchronous bits indicative of the asynchronous information;

a signal allocator having at least one input port selectively coupled to receive the asynchronous bits and the isochronous bits, said signal allocator for forming an allocated signal by selectively combining the received asynchronous bits and the received isochronous bits;

a mapper selectively coupled to receive the allocated signal, said mapper for mapping the allocated signal onto symbols of a multi-level modulation symbol set, the symbols of the multi-level symbol set onto which the allocated signal is mapped are dependent upon values of the isochronous and asynchronous bits within the allocated signal; and a transmitter coupled to receive the symbol onto which the allocated signal is mapped by said mapper, said transmitter for transmitting the symbol forming the isochronous and asynchronous data upon the communication channel.

3. In the communication system of claim 2, a combination with the receiving station of receive circuitry for recovering the isochronous and asynchronous data formed of the symbol transmitted by said transmitter upon the communication channel, said receive circuitry comprising:

a receiver tunable to the communication channel, said receiver for receiving the symbol transmitted by the transmitter and for forming a receive signal indicative thereof;

a mapper coupled to receive the receive signal formed by said receiver, said mapper for mapping the symbol of which the receive signal is indicative into an allocated signal;

a signal deallocator for separating the allocated signal into the isochronous bits and the asynchronous bits representing the isochronous and asynchronous data; and a decoder coupled to receive the isochronous and asynchronous bits, respectively, said decoder for decoding the isochronous and asynchronous bits, thereby to recover the isochronous and asynchronous data therefrom.

4. In a transmitter operable to transmit speech data representative of isochronous information and asynchronous data representative of asynchronous information upon a communication channel, an improvement of information-combining circuitry for forming a combined signal which, when transmitted, permits simultaneous transmission of the isochronous data and asynchronous data upon the communication channel, said information-combining circuitry comprising:

a signal allocator having at least one input port selectively coupled to receive signals representative of the isochronous data and signals representative of the asynchronous data, said signal allocator for forming an allocated signal of values responsive to values of the signals representative of the isochronous data and the signals representative of the asynchronous data selectively coupled to be received thereat; and a mapper coupled to receive the allocated signal, said mapper for mapping selected portions of the allocated signal onto symbols of a multi-symbol modulation symbol set, the symbols of the multi-symbol set onto which the selected portions of the allocated signal are mapped dependent upon values of the allocated signal, the symbols onto which the portions of the allocated isochronous data and the asynchronous data signal are mapped forming the combined signal.

5. The circuitry of claim 4 further comprising an isochronous information bit generator coupled to receive the isochronous information, said isochronous information bit generator for generating isochronous bits indicative of the isochronous information and wherein the signals representative of the isochronous data received at a first input port of said at least one input port of said signal allocator comprises the isochronous bits.

6. The circuitry of claim 5 wherein said isochronous information signal bit generator comprises a digitizer coupled to receive the isochronous information, said digitizer for digitizing the isochronous information and for forming digitized isochronous signals, a coder coupled to receive the digitized isochronous signals, said coder for coding the digitized isochronous signals and for forming coded isochronous signals responsive thereto, an interleaver coupled to receive the coded isochronous signals, said interleaver for interleaving the coded isochronous signals and for forming interleaved isochronous signals responsive thereto, and a scrambler coupled to receive the interleaved signals, said scrambler for scrambling the interleaved signals and for forming scrambled isochronous signals, the scrambled isochronous signals forming the isochronous signal bits.

7. The circuitry of claim 4 further comprising a asynchronous information bit generator coupled to receive the asynchronous information, said asynchronous information bit generator for generating asynchronous bits indicative of the asynchronous information and wherein the signals representative of the asynchronous data received at a second input port of said signal allocator input port comprises the asynchronous bits.

8. The circuitry of claim 7 wherein said asynchronous information signal bit generator comprises a digitizer coupled to receive the asynchronous information, said digitizer for digitizing the asynchronous information and for forming digitized asynchronous signals, a coder coupled to receive the digitized asynchronous signals, said coder for coding the digitized asynchronous signals and for forming coded asynchronous signals responsive thereto, an interleaver coupled to receive the coded asynchronous signals, said interleaver for interleaving the coded asynchronous signals and for forming interleaved asynchronous signals responsive thereto, and a scrambler coupled to receive the interleaved asynchronous signals, said scrambler for scrambling the interleaved asynchronous signals and for forming scrambled asynchronous signals, the scrambled asynchronous signals forming the asynchronous signal bits.

9. The circuity of claim 4 wherein said signal allocator comprises a multiplexer for multiplexing the signals representative of the speech information and the signals representative of the asynchronous information, said at least one input port comprises a first input port and a second input port formed of a first input terminal and a second input terminal, respectively, of said multiplexer, and wherein said mapper is coupled to receive the signals representative of the isochronous data and the asynchronous data once multiplexed together by said multiplexer.

10. The circuity of claim 4 wherein the multi-symbol modulation symbol set onto which the symbols thereof said mapper maps the signals representative of the isochronous data and the asynchronous data comprises a multi-phase modulation symbol set.

11. The circuitry of claim 4 wherein the multi-symbol modulation symbol set onto which the symbols thereof said mapper maps the signals representative of the isochronous data and the asynchronous data comprises a multi-level modulation symbol set.

12. The circuitry of claim 4 wherein the symbols of the multi-level symbol set are represented by complex valued numbers represented by a first real-valued component and a second real-valued component.

13. The circuitry of claim 12 wherein the first real-valued component is formed of a selected combination of values of the signal representative of the isochronous information.

14. The circuitry of claim 12 wherein the second real-valued component is formed of a selected combination of values of the signal representative of the asynchronous information.

15. The circuitry of claim 4 wherein the asynchronous information comprises textual information and wherein a second input port receives signals representative of the textual information.

16. The circuity of claim 4 wherein the transmitter forms a portion of a multi-media communication system, wherein the asynchronous information comprises diagrammatic information and wherein said at least one input port of the signal allocator receives signals representative of the diagrammatic information.

17. The circuitry of claim 4 wherein the transmitter forms a portion of a multi-mode communication system, wherein the asynchronous information comprises control information, and wherein said at least one input port of the signal allocator receives signals representative of the control information.

18. The circuitry of claim 4 wherein the asynchronous information comprises a first-type asynchronous information portion and a second-type asynchronous information portion, wherein said at least one input port of said signal allocator comprises a first input port, a second input port, and a third input port, the first input port coupled to receive the signals representative of the isochronous data, the second input port for receiving the first-type asynchronous information portion of the signals representative of the asynchronous data, and the third input port for receiving the second-type asynchronous information portion of the signals representative of the asynchronous data.

19. The circuitry of claim 4 further comprising a controller coupled to receive indications of rates at which the signals representative of the isochronous information and at which the signals representative of the asynchronous information are applied to said signal allocator, said controller further coupled to said signal allocator, said controller for controlling the coupling of said signal allocator to receive the signals representative of the isochronous information and the asynchronous information, respectively, responsive, at least in part upon the rates of which the indications thereof are received at said controller.

20. The circuitry of claim 4 further comprising a controller coupled to receive indications of rates at which the signals representative of the isochronous information and at which the signals representative of the asynchronous information are applied to said signal allocator, said controller further coupled to said signal allocator, said controller for controlling the coupling of said signal allocator to receive the signals representative of the isochronous information and the asynchronous information, respectively, responsive, at least in part upon indications of channel conditions of the communication channel.

21. A method for simultaneously transmitting isochronous data representative of isochronous information and asynchronous data representative of asynchronous information upon a communication channel, said method comprising the steps of:

generating isochronous bits indicative of the isochronous information;

generating asynchronous bits indicative of the asynchronous information;

selectively combining the isochronous and asynchronous bits into an allocated signal;

selectively mapping the allocated signal onto symbols of a multi-level modulation symbol set, the symbols of the multi-level symbol set onto which the allocated signal is selectively mapped dependent upon values of the isochronous and asynchronous bits and forming the isochronous asynchronous data; and transmitting the symbol containing the isochronous and asynchronous data upon the communication channel.

* * * * *